United States Patent
Smith et al.

(10) Patent No.: US 6,357,315 B1
(45) Date of Patent: Mar. 19, 2002

(54) DIFFERENTIAL LOCK AND FOUR WHEEL DRIVE CONTROL ARRANGEMENT

(75) Inventors: Derek John Smith, Sutton Coldfield; David William Seccull, Coventry, both of (GB)

(73) Assignee: AGCO Limited (GB)

( * ) Notice: Subject to any disclaimer, the term of this patent is extended or adjusted under 35 U.S.C. 154(b) by 0 days.

(21) Appl. No.: 09/467,410

(22) Filed: Dec. 20, 1999

(30) Foreign Application Priority Data

Dec. 23, 1998 (GB) .............................................. 9828487

(51) Int. Cl.[7] .......................... B60K 23/08; F16H 59/02; F16H 63/34
(52) U.S. Cl. ................................ 74/473.11; 74/473.19; 74/473.21; 74/473.3; 180/247
(58) Field of Search ......................... 74/473.11, 473.19, 74/473.21, 473.3; 180/247

(56) References Cited

U.S. PATENT DOCUMENTS 4,150,586 A * 4/1979 Mueller, Jr. ................... 74/532
4,793,207 A * 12/1988 Old .......................... 74/512 X

FOREIGN PATENT DOCUMENTS

EP 434640 6/1991

* cited by examiner

*Primary Examiner*—Allan D. Herrmann
(74) *Attorney, Agent, or Firm*—MacMillan, Sobanski & Todd, LLC

(57) ABSTRACT

An arrangement 1 for selectively actuating the four-wheel drive and differential lock engagement means of a vehicle comprises a hand operable selector mounted a bracket 4, the bracket 4 including a pathway, the selector comprising a protrusion which co-operates with the said pathway, so that movement of the selector in a first direction from a first position to a second position actuates four-wheel drive, and further movement in the first direction from the second position to a third position actuates the said differential lock, the pathway preventing the selector from moving in the first direction from the second position to the third position without first being moved in a second direction.

12 Claims, 2 Drawing Sheets

DIFFERENTIAL LOCK AND FOUR WHEEL DRIVE CONTROL ARRANGEMENT

FIELD OF THE INVENTION

This invention relates to arrangements for controlling the engagement and disengagement of the differential lock and four wheel drive mechanisms of a vehicle.

BACKGROUND OF THE INVENTION

Agricultural tractors conventionally comprise a back axle to which large diameter wheels are attached, these wheels not being steered, and smaller front wheels, which are steered. The rear wheels generate the main tractive force. On some tractors there is no provision to drive the front wheels, their only purpose being to steer the tractor. Other tractors are provided with steerable front wheels which are, or can be, driven.

This invention relates to tractors having front wheels, which may be driven. These tractors are well known to those skilled in the art as four-wheel drive tractors. The invention particularly relates to those four-wheel drive tractors where drive to the front wheels is selectively engageable and disengageable.

Agricultural tractors are usually provided with a differential lock in the back axle for reasons which are well known to those skilled in the art. Four wheel drive tractors are usually provided some form of differential in the front axle.

It is known to provide electro-hydraulic control systems, which engage and disengage the four-wheel drive and/or differential lock at the flick of a switch. In more complicated control systems sensors engage and disengage the four wheel drive and/or differential lock automatically to ensure the optimum and safe performance of the tractor.

In many countries of the world there is not the requirement for, or the ability to maintain, complex electro-hydraulic control systems, and there is therefore a need for a simpler means to control engagement and disengagement of the four wheel drive and/or differential lock.

It will be understood that whilst the invention is described with reference to an agricultural tractor, it is not limited to use with such a vehicle. The invention may be used with any four-wheel drive vehicle where two or four-wheel drive may be engaged/disengaged, and one or more differential locks which may be engaged/disengaged.

SUMMARY OF THE INVENTION

The invention provides an arrangement for selectively actuating the four-wheel drive and differential lock engagement means of a vehicle, the arrangement comprising a hand operable selector mounted in mounting means, the mounting means including a pathway, wherein the selector which co-operates with the said pathway, and wherein movement of the selector in a first direction from a first position to a second position actuates four-wheel drive, and further movement in the first direction from the second position to a third position actuates the said differential lock, characterised in that the pathway prevents the selector from moving in the first direction from the second position to the third position without first being moved in a second direction.

The selector may comprise a protrusion which co-operates with the pathway. The protrusion may comprise a lever, or a bracket.

The mounting means preferably comprises a bracket.

The selector may comprise a shaft mounted in the said mounting means, and the shaft may have a handle attached thereto.

Preferably, the shaft is mounted in the mounting means to move in the first direction axially, and in the second direction to rotate about its own longitudinal axis. Movement of the shaft in the second direction may be confined to rotation through an angle ($\alpha$).

The arrangement may further comprise biasing means to bias the shaft against movement in the said second direction, and the said biasing means may comprise a spring.

Advantageously, the four-wheel drive and differential lock engagement means comprises a hydraulic valve, and the arrangement comprises a valve actuator, and connecting means to connect the valve actuator to the selector. The connecting means may comprise a rod, one end of said rod being attached to the selector, the other end being attached to the valve actuator. The valve actuator may comprise a pivotally mounted lever.

Preferably, at the selector end the rod is attached to a bracket extending from the shaft of the selector.

The invention also provides a tractor comprising an arrangement for selectively actuating the four-wheel drive and differential lock engagement means of the said tractor.

The invention provides an arrangement for engaging the tractor's four-wheel drive and differential lock, which is simple to manufacture, operate, and maintain. The arrangement is also inherently safe, insofar as the operator cannot engage the differential lock without taking a positive decision to do so, i.e. he must twist the handle before he can lift the handle upwards to engage the differential lock. The selector is biased into the safe position.

The invention can be used to engage or disengage one or more differential locks.

BRIEF DESCRIPTION OF THE DRAWINGS

In the drawings, which illustrate exemplary embodiments of the invention.

DETAILED DESCRIPTION OF THE PREFERRED EMBODIMENTS

Figure 1:
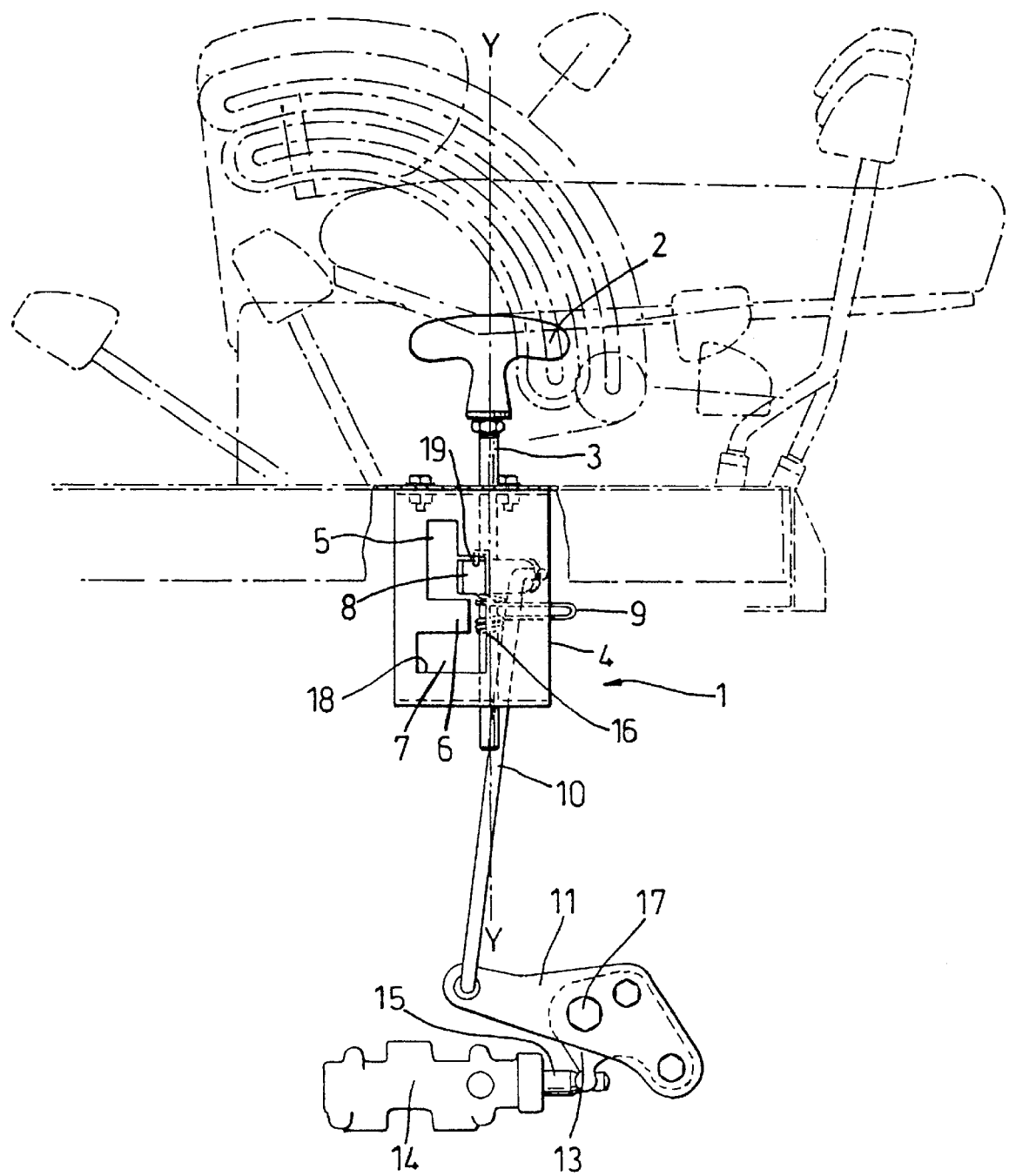
FIG. 1 is a side view of a differential lock and four wheel drive control arrangement according to the invention.
Figures 2, 3:
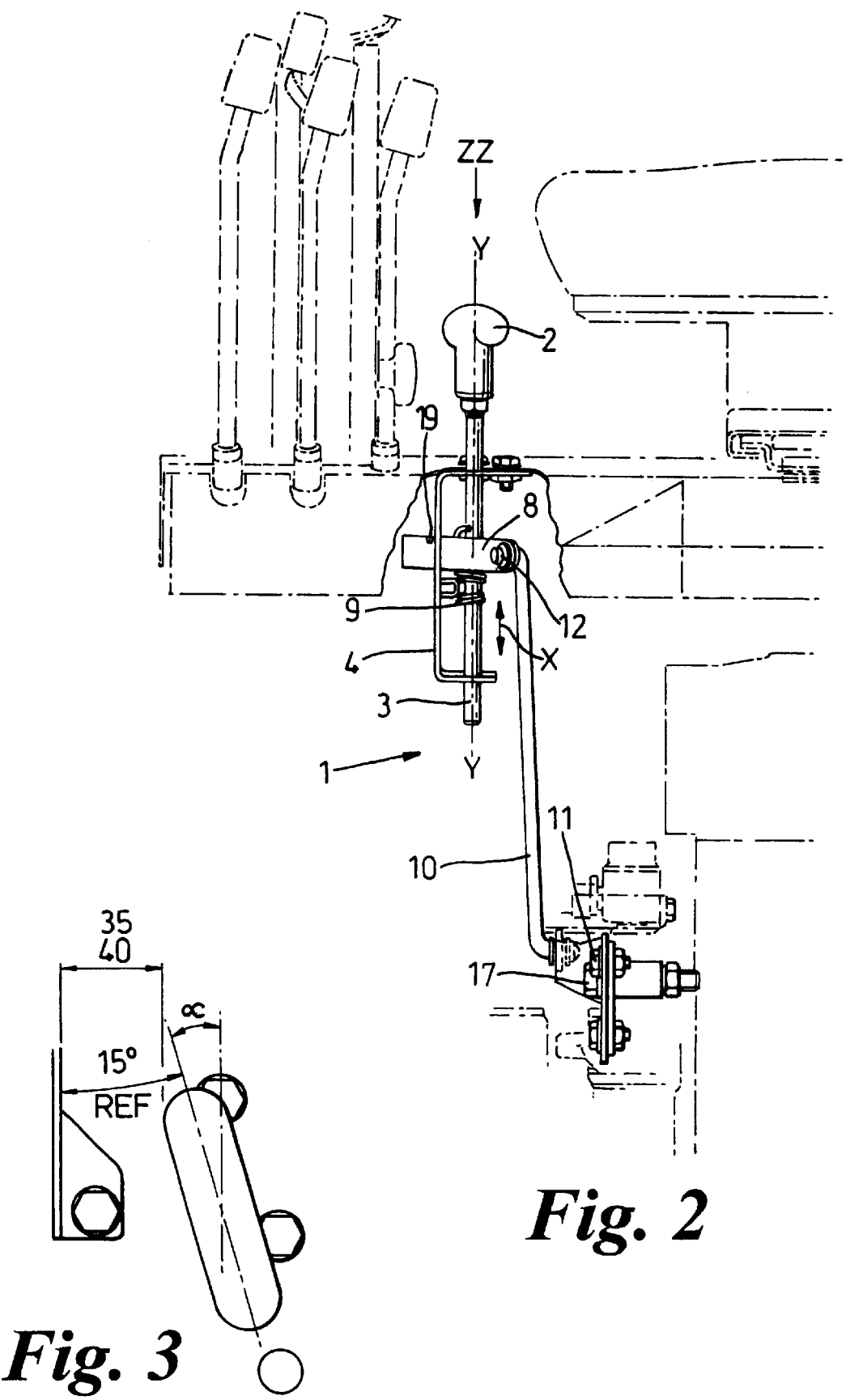
FIG. 2 is a front view of the arrangement illustrated in FIG. 1.
FIG. 3 is a plan view in the direction of arrow ZZ of FIG. 2.

In FIGS. 1 to 3 a differential lock and four-wheel drive control arrangement is generally illustrated by reference numeral 1. The arrangement comprises a hand operable selector including a handle 2 connected to a shaft 3. The shaft 3 is mounted in a bracket 4 so that the operator may rotate the shaft about its longitudinal axis Y—Y by gripping the handle 2 and making a twisting movement. The shaft 3 is mounted in the bracket 4 so that it can slide axially in the direction indicated by arrow X in FIG. 2.

A protrusion, such as a lever 8, is fixed to the shaft 3, and extends in a direction perpendicular to the longitudinal axis of the shaft 3 to either side thereof. One end of a rod 10 passes through an aperture in the lever 8, and the rod is fastened in place in the aperture by means of a clip 12. The other end of the rod is attached to a lever 11. The lever 11 comprises a coupling 13 which is coupled to the position of a hydraulic valve 14.

The hydraulic valve 14 controls the actuation of the four-wheel drive, i.e. engagement of drive to the front axle, and the differential lock. The valve 14 is connected to a supply of pressurised hydraulic fluid, and has three positions. In the first position, with the piston fully extended, the valve prevents hydraulic fluid flowing either to the four-wheel drive engagement clutch pack or the differential lock engagement clutch pack (not shown). In the second position, with the piston partially retracted (as shown in FIG. 1), the valve permits hydraulic fluid to flow to the four-wheel drive engagement clutch pack, but not to the differential lock engagement clutch pack. In the third position, with the piston fully retracted, the valve permits hydraulic fluid to flow to both the four-wheel drive and differential lock engagement clutch packs.

Movement of the piston 15 between the three said positions is controlled by moving the handle 2, and therefore the shaft 3 into a first, second or third position corresponding to the relative positions of the piston 15. The bracket 4 comprises a cutaway path having an upper space 5 and a lower space 7, the spaces being separated by projection 6. The lever 8 co-operates with the cutaway path to control the position of the piston 15.

The operation of the arrangement will now be described with reference to FIGS. 1 to 3. As illustrated, the piston 15 is in the second position. To move the piston 15 to the first position, the operator pushes the handle downwards in the direction X. The horizontal edge 18 of the cutaway path limits movement of the lower level 8. By moving the handle 2 downwards in the direction X, the rod 10 causes the lever 11 to rotate, thereby pulling the piston 15 out of the body of the hydraulic valve 14.

In the position shown in FIGS. 1 to 3, further upward movement of the handle 2, and hence the lever 8 is prevented by the upper edge of the lever 8 coming into contact with the horizontal edge 19 of the cutaway path.

To move the piston to the third position the handle is rotated through an angle ($\alpha$), and then lifted upwards in the direction X. Rotating the handle 2 through the angle ($\alpha$) rotates the lever 8 through the same angle. The lever is thereby moved away from the position in which upward movement is prevented, to a position where the lever 8 is aligned with the upper space 5 where upward movement of the handle 2, and hence lever 8 is permitted. The angle ($\alpha$) is approximately equal to zero when the lever 8 is in the position where upward movement thereof is permitted. Lifting the handle 2 in the direction X lifts shaft 3, which in turn causes the lever 11 to pivot about the pin 17, thereby pushing the piston 15 into the cylinder 14.

A coil spring 9 is mounted on the shaft 3, with a portion of the coil spring engaging with the inside of the bracket 4. The purpose of the spring 9 is to bias the shaft, and therefore the handle 2 into a position where the lever 8 is not aligned with the upper space 5, but is aligned with the space between the end of projection 6 and the vertical edge 16, i.e. the position shown in the figures.

The invention provides an arrangement for engaging the tractor's four-wheel drive and differential lock, which is simple to manufacture, operate, and maintain. The arrangement is also inherently safe, insofar as the operator cannot engage the differential lock without taking a positive decision to do so, i.e. he must twist the handle before he can lift the handle upwards to engage the differential lock. The spring 9 biases the shaft 3, and therefore the handle 2 and lever 8 into the safe position.

What we claim is:

1. An arrangement for selectively actuating the four-wheel drive and differential lock engagement means of a vehicle, the arrangement comprising a hand operable selector mounted in mounting means, the mounting means including a pathway, wherein the selector co-operates with the said pathway, and wherein movement of the selector in a first direction from a first position to a second position actuates the four-wheel drive, and further movement in the first direction from the second position to a third position actuates the said differential lock, and wherein the pathway prevents the selector from moving in the first direction from the second position to the third position without first being moved in a second direction.

2. An arrangement according to claim 1, wherein the selector comprises a protrusion which co-operates with the said pathway.

3. An arrangement according to claim 1, wherein the selector comprises a shaft mounted in the said mounting means, the shaft having a handle attached thereto.

4. An arrangement according to claim 1, wherein the shaft is mounted in the mounting means to move in the first direction axially, and in the second direction to rotate about its own longitudinal axis.

5. An arrangement according claim 4, further comprising biasing means to bias the shaft against movement in the said second direction.

6. An arrangement according to claim 5, wherein the said biasing means comprises a spring.

7. An arrangement according to claim 1, wherein the mounting means comprises a bracket.

8. An arrangement according to claim 1, wherein the four-wheel drive and differential lock engagement means comprises a hydraulic valve, and wherein the arrangement comprises a valve actuator, and connecting means to connect the valve actuator to the selector.

9. An arrangement according to claim 8, wherein the connecting means comprises a rod, one end of said rod being attached to the selector, the other end being attached to the valve actuator.

10. An arrangement according to claim 8, wherein the valve actuator comprises a pivotally mounted lever.

11. An arrangement according to claim 9, wherein at the selector end the rod is attached to a lever extending from the said shaft.

12. A tractor comprising four-wheel drive and differential lock engagement means, and an arrangement for selectively actuating said four-wheel drive and differential lock engagement means of said tractor, the arrangement comprising a hand operable selector mounted in mounting means, the mounting means including a pathway, wherein the selector co-operates with the said pathway, and wherein movement of the selector in a first direction from a first position to a second position actuates the four-wheel drive, and further movement in the first direction from the second position to a third position actuates the said differential lock, and wherein the pathway prevents the selector from moving in the first direction from the second position to the third position without first being moved in a second direction.

* * * * *